US012363187B2

(12) United States Patent
Singleton et al.

(10) Patent No.: US 12,363,187 B2
(45) Date of Patent: Jul. 15, 2025

(54) UDP FILE SERIALIZATION IN ONE-WAY TRANSFER SYSTEMS

(71) Applicant: Microsoft Technology Licensing, LLC, Redmond, WA (US)

(72) Inventors: William Jeramy Singleton, Purcellville, VA (US); Jeffrey Allen West, Woodinville, WA (US)

(73) Assignee: Microsoft Technology Licensing, LLC

( * ) Notice: Subject to any disclaimer, the term of this patent is extended or adjusted under 35 U.S.C. 154(b) by 0 days.

(21) Appl. No.: 18/326,339

(22) Filed: May 31, 2023

(65) Prior Publication Data

US 2024/0406248 A1    Dec. 5, 2024

(51) Int. Cl.
*H04L 67/06* (2022.01)
*G06F 11/14* (2006.01)
*H04L 69/16* (2022.01)

(52) U.S. Cl.
CPC .......... *H04L 67/06* (2013.01); *G06F 11/1435* (2013.01); *H04L 69/16* (2013.01)

(58) Field of Classification Search
None
See application file for complete search history.

(56) References Cited

U.S. PATENT DOCUMENTS

| | | | | |
|---|---|---|---|---|
| 6,829,741 B1 * | 12/2004 | Khansari | ............... | H04L 1/0083 714/701 |
| 7,272,613 B2 * | 9/2007 | Sim | ......................... | H04L 69/14 707/999.102 |
| 7,418,620 B1 * | 8/2008 | Tormasov | ........... | G06F 11/1076 714/6.24 |
| 7,613,748 B2 * | 11/2009 | Brockway | ................. | G06F 7/00 |
| 8,296,844 B2 | 10/2012 | Bogner | | |
| 8,365,266 B2 | 1/2013 | Bogner | | |
| 8,416,742 B2 * | 4/2013 | Park | ...................... | H04H 20/57 370/328 |
| 8,468,235 B2 | 6/2013 | Bogner | | |

(Continued)

FOREIGN PATENT DOCUMENTS

| | | |
|---|---|---|
| CN | 110915180 B | 6/2022 |
| EP | 2865156 B1 | 10/2017 |

OTHER PUBLICATIONS

Notice of Allowance mailed on Feb. 8, 2024, in U.S. Appl. No. 18/326,368, 9 pages.

(Continued)

*Primary Examiner* — Backhean Tiv

(57) ABSTRACT

Examples of the present disclosure describe systems and methods for UDP file serialization. In examples, a file received at a first device in a OWT system is separated into multiple data chunks. Each of the data chunks is further separated into multiple data segments. Metadata associated with the file is inserted into each of the data chunks and each of the data segments. Data packets that comprise the data segments and compose the data chunks are transmitted to a second device in the OWT system. The second device uses the metadata in the data chunks and the data segments to reconstruct the file. In some examples, data loss mitigation strategies are implemented to mitigate data packet loss and data packet corruption during processing and transmission.

20 Claims, 8 Drawing Sheets

(56) References Cited

U.S. PATENT DOCUMENTS

| | | | | |
|---|---|---|---|---|
| 8,620,877 | B2* | 12/2013 | Smith | G06F 16/1756 |
| | | | | 707/692 |
| 9,098,376 | B2* | 8/2015 | Resch | H04L 69/14 |
| 9,276,980 | B2* | 3/2016 | Chan | H04B 7/26 |
| 9,367,703 | B2 | 6/2016 | Chinta | |
| 9,444,856 | B2* | 9/2016 | Phillips | H04N 21/44222 |
| 9,477,677 | B1* | 10/2016 | Wang | G06F 16/1752 |
| 9,697,217 | B1* | 7/2017 | Salyers | G06F 16/137 |
| 9,697,228 | B2* | 7/2017 | Subramanian | G06F 11/1435 |
| 9,706,249 | B2* | 7/2017 | Hao | H04N 21/632 |
| 9,769,235 | B2* | 9/2017 | Schmidt | H04L 65/70 |
| 10,110,657 | B2* | 10/2018 | Mitic | H04L 65/611 |
| 10,205,761 | B2* | 2/2019 | DiMattia | H04L 65/70 |
| 10,289,310 | B2* | 5/2019 | Xu | G06F 3/0643 |
| 10,976,949 | B1* | 4/2021 | Calhoun, Jr. | G06F 3/0643 |
| 11,106,810 | B2 | 8/2021 | Natanzon | |
| 11,184,399 | B2 | 11/2021 | Foley | |
| 11,397,808 | B1 | 7/2022 | Prabhu | |
| 11,729,407 | B2 | 8/2023 | Mazumdar | |
| 11,818,120 | B2 | 11/2023 | Jen | |
| 2002/0133491 | A1* | 9/2002 | Sim | H04L 69/14 |
| 2006/0027078 | A1* | 2/2006 | Kawashima | G10H 1/0066 |
| | | | | 84/609 |
| 2006/0242153 | A1* | 10/2006 | Newberry | H04L 65/1101 |
| 2006/0268932 | A1 | 11/2006 | Singh et al. | |
| 2009/0003216 | A1 | 1/2009 | Radunovic et al. | |
| 2010/0034206 | A1 | 2/2010 | Xue et al. | |
| 2011/0110657 | A1 | 5/2011 | Feuer | |
| 2011/0277013 | A1 | 11/2011 | Chinta | |
| 2012/0017079 | A1 | 1/2012 | Mraz | |
| 2012/0131025 | A1* | 5/2012 | Cheung | G06F 16/1752 |
| | | | | 707/755 |
| 2013/0041872 | A1* | 2/2013 | Aizman | G06F 16/182 |
| | | | | 707/690 |
| 2013/0138775 | A1* | 5/2013 | Shah | H04L 67/568 |
| | | | | 709/219 |
| 2013/0232233 | A1* | 9/2013 | Reza | H04N 19/61 |
| | | | | 709/219 |
| 2014/0281804 | A1* | 9/2014 | Resch | G06F 11/1096 |
| | | | | 714/763 |
| 2014/0317071 | A1* | 10/2014 | Zhou | G06F 16/13 |
| | | | | 707/705 |
| 2014/0337410 | A1 | 11/2014 | Mraz | |
| 2015/0058925 | A1* | 2/2015 | Curry | H04L 63/08 |
| | | | | 726/3 |
| 2015/0089072 | A1* | 3/2015 | Phillips | H04L 65/1083 |
| | | | | 709/231 |
| 2015/0149819 | A1* | 5/2015 | Lee | G06F 11/1076 |
| | | | | 714/6.24 |
| 2015/0264408 | A1* | 9/2015 | Hao | H04N 21/25841 |
| | | | | 725/23 |
| 2015/0358305 | A1 | 12/2015 | Vänskä | |
| 2015/0381690 | A1* | 12/2015 | Schmidt | H04L 65/70 |
| | | | | 709/231 |
| 2017/0257178 | A1* | 9/2017 | Hall | H04L 12/1845 |
| 2017/0357497 | A1* | 12/2017 | Lin | G06F 8/65 |
| 2018/0330108 | A1 | 11/2018 | Gordon | |
| 2019/0188196 | A1* | 6/2019 | Kumar | G06F 16/125 |
| 2019/0377709 | A1* | 12/2019 | Kochan | G06F 3/0619 |
| 2020/0228574 | A1 | 7/2020 | Summers | |
| 2021/0172997 | A1 | 6/2021 | Tart et al. | |
| 2021/0176306 | A1 | 6/2021 | Robl et al. | |
| 2021/0303192 | A1* | 9/2021 | Duttagupta | G06F 16/9027 |
| 2022/0083250 | A1* | 3/2022 | Gupta | G06F 3/0644 |
| 2022/0182734 | A1* | 6/2022 | Ryder | H04N 21/2323 |
| 2022/0256397 | A1 | 8/2022 | Wu et al. | |
| 2023/0095692 | A1* | 3/2023 | Hong | G06V 20/49 |
| | | | | 375/240.29 |
| 2023/0334491 | A1 | 10/2023 | Leddy, III | |
| 2025/0053468 | A1 | 2/2025 | West | |

OTHER PUBLICATIONS

Bradbury, Richard, "TM-MCAST0137r1A176r3 Adaptive-Media-Streaming-over-IP-Multicast Jan. 2023 (changes since r2)", Digital Video Broadcasting, No. 1, Jan. 31, 2023, 178 Pages.

International Search Report and Written Opinion received for PCT Application No. PCT/US2024/030158, Sep. 11, 2024, 13 pages.

Lee, et al., "Untraceable Blind Packet Forwarding Using Centralized Path Control," In Proceedings of IEEE Military Communications Conference, Oct. 6, 2014, pp. 268-273.

Simsek, Irfan, "Blind Packet Forwarding," In dissertation submitted to Institute for Computer Science and Business Information Systems, 250 Pages, Aug. 11, 2016.

Simsek, Irfan, "On-Demand Blind Packet Forwarding," In Proceedings of 30th International Telecommunication Networks and Applications Conference, Nov. 25, 2020, 8 Pages.

Notice of Allowance mailed on May 20, 2024, in U.S. Appl. No. 18/326,368, 7 pages.

International Search Report and Written Opinion received for PCT Application No. PCT/US2024/026930, Jul. 26, 2024, 16 pages.

* cited by examiner

UDP FILE SERIALIZATION IN ONE-WAY TRANSFER SYSTEMS

BACKGROUND

User Datagram Protocol (UDP) is used to transmit messages between endpoints in an internet protocol (IP) network. In a one-way transfer (OWT) system, UDP must be used to structure and transmit file-based content to endpoints that communicate across the boundaries of the OWT system. However, there are currently no standard protocols to transmit files over UDP in an OWT system.

It is with respect to these and other general considerations that the aspects disclosed herein have been made. Also, although relatively specific problems may be described, it should be understood that the examples should not be limited to solving the specific problems identified in the background or elsewhere in this disclosure.

SUMMARY

Examples of the present disclosure describe systems and methods for UDP file serialization. In examples, a file received at a first device in a OWT system is separated into multiple data chunks. Each of the data chunks is further separated into multiple data segments. Metadata associated with the file is inserted into each of the data chunks and each of the data segments. Data packets that comprise the data segments and compose the data chunks are transmitted to a second device in the OWT system. The second device uses the metadata in the data chunks and the data segments to reconstruct the file. In some examples, data loss mitigation strategies are implemented to mitigate data packet loss and data packet corruption during processing and transmission.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Figure 1A:
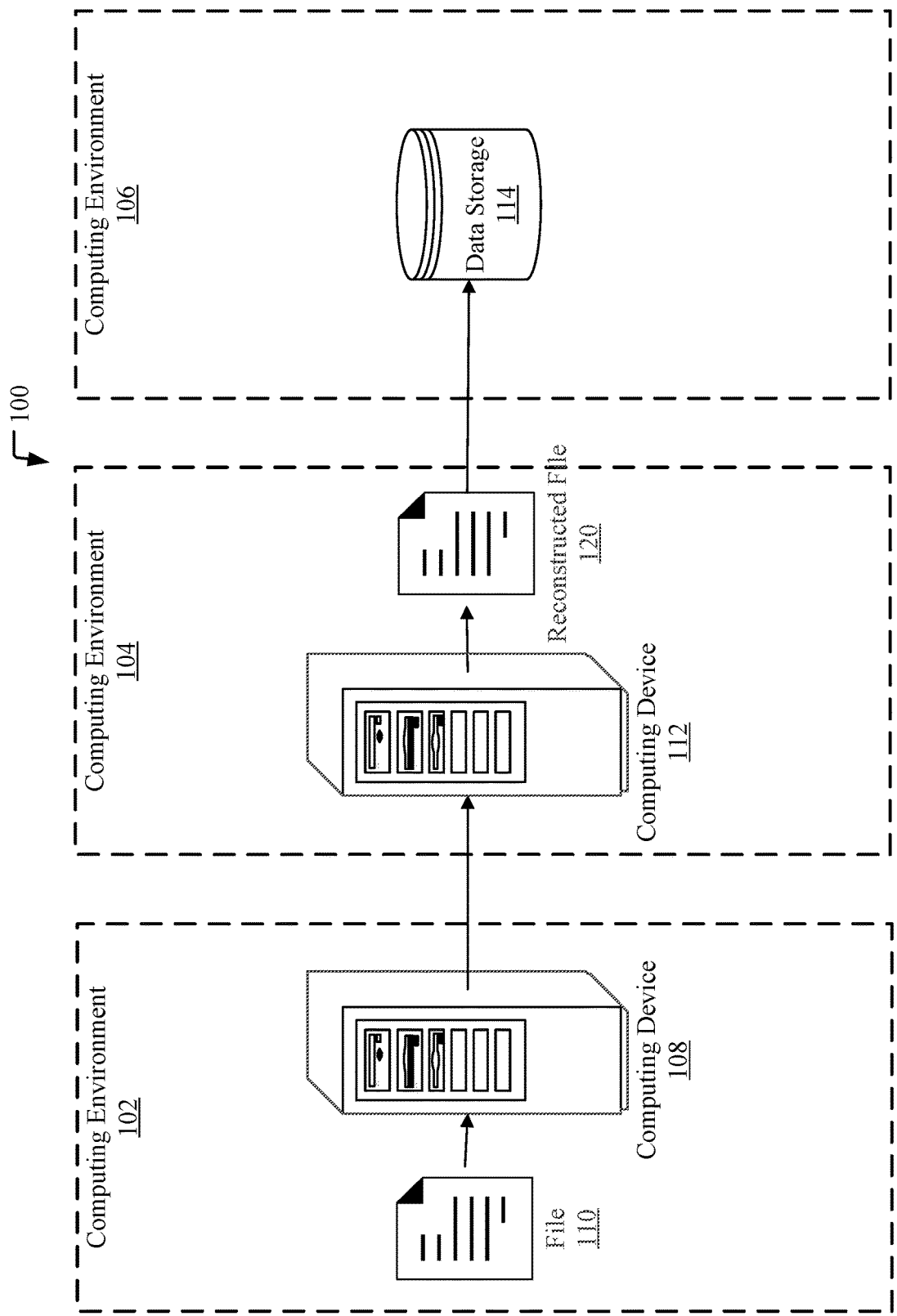
FIGS. 1A and 1B illustrate an example system that implements UDP file serialization in an OWT system.

A one-way transfer (OWT) system refers to a computing system in which one or more endpoints are (or are separated by) data diodes configured to ensure that data packets can be transferred only unidirectionally through the computing system. In examples, the data diodes ensure unidirectional data packet transfer through implementation of hardware and/or software components, such as a transmit-only network interface card (NIC). A transmit-only NIC transmits data to an endpoint but cannot receive data from the endpoint due to the physical severing of the receive pin on the network controller chip of the transmit-only NIC. In some examples, the transmit-only NIC also comprises firmware which sets the link state of the transmit-only NIC to always be "up" (e.g., enabled and/or active).

In many cases, OWT systems are used to protect a network or endpoints against outbound data transmissions, malicious inbound data transmissions (e.g., viruses and malware), and cyberattacks. As one example, OWT systems facilitate the transfer of data between computing environments having the same or different security levels (e.g., high-security or low-security), where at least one of the computing environments is low-trust with respect to another of the computing environments. For instance, a first computing environment that is high-trust with respect to the devices of the first computing environment and/or with respect to devices of one or more other computing environments may receive data from a second computing environment that is considered to be low-trust by the first computing environment.

In examples, a high-trust environment refers to a system or network where the devices, applications, and users are considered trustworthy, and security measures are in place to establish and maintain that trust. In this type of environment, the devices and/or parties involved, such as devices, software, and users, are often authenticated, authorized, and/or adhere to established security policies and best practices. High-trust environments usually have rigorous access controls, encryption, and monitoring to ensure that trust is maintained and to minimize the risk of unauthorized access, data breaches, or other security incidents. Devices within high-trust environments may be authorized to access or be accessed by other devices based on security techniques that are implemented by the high-trust environments (e.g., unique encryption keys, secrets, or other cryptographical techniques). For instance, the communications transmitted by a high-trust environment may be considered trustworthy by other computing environments or devices based on the high-trust environment (or devices thereof) being included in an allowlist (e.g., a list of approved devices and/or computing environments). Alternatively, the communications transmitted by a high-trust environment may be considered trustworthy based on a password or credential provided with the communications. In some examples, the devices in a high-trust environment do not require authentication to access or be accessed by other devices. A high-trust environment generally does not expose the security techniques implemented by the high-trust environment to other computing environments, which may be considered low-trust or no-trust environments by the high-trust environment.

By contrast, a low-trust or no-trust environment refers to a system or network where the devices, applications, and/or users are not implicitly trusted or where there is a high risk of unauthorized access or malicious activities. Low-trust or no-trust environments may have limited or no security measures in place, or may include or be connected to one or more external or unmanaged devices. Alternatively or additionally, a low-trust or no-trust environment refers to an environment in which the devices are not considered to be secured or trustworthy by other devices within and/or external to the low-trust or no-trust environments. As the security techniques implemented by the high-trust environment are not exposed to low-trust or no-trust environments, low-trust or no-trust environments may not be able to access or communicate with a high-trust environment without performing various authorization and/or authentication steps that need not be performed by devices in high-trust environments. In examples, an OWT system may span or include multiple computing environments that are separated by one or more boundaries between the computing environments.

Thus, in such OWT systems, protocols that require handshaking between endpoints cannot be used. Rather, connectionless communication protocols, such as User Datagram Protocol, must be used. User Datagram Protocol (UDP) is a computer networking communication protocol used to transmit data (comprised in data packets) between source and destination endpoints (e.g., physical computing devices or virtualized computing components) in an internet protocol (IP) network. UDP uses a connectionless communication model in which data can be transmitted between endpoints without first ensuring that the destination endpoint is available to receive the data. As connectionless communication models do not facilitate handshaking protocols (e.g., an automated process for establishing parameters for communications between endpoints), UDP does not provide a guarantee of data packet delivery, data packet ordering, or data packet duplication protection.

Due to the unidirectional data transmission of OWT system, UDP (or a similar protocol using connectionless communication) must be used to structure and transmit file-based content to endpoints that communicate across the boundaries of the OWT system. However, there are currently no standard communication protocols to transmit files over UDP in an OWT system.

The present disclosure provides a solution that enables UDP file serialization in an OWT system. In embodiments of the present disclosure, a file provided from a first computing environment is processed at a first device in a OWT system. The first device serializes the file by separating the file into multiple data chunks. In examples, the size of the multiple data chunks is based on the size of the file (e.g., the file is separated into a quantity of data chunks, where each data chunk is the same size) or a predefined size limit (e.g., the file is separated into two-megabyte data chunks, where the last data chunk may be less than two megabytes). Metadata is inserted into each of the multiple data chunks to facilitate processing of the multiple data chunks. Examples of data chunk metadata include a file identifier, a file type, a content or section identifier, a transaction identifier, a data chunk number, a data chunk hash value, a data chunk size or length, and a data chunk offset.

The first device further serializes the file by separating the multiple data chunks into multiple data segments. Each of the multiple data segments may correspond to (or include data from) a specific data packet type, such as a begin file data packet, a begin chunk data packet, a data stream data packet, an end chunk data packet, or an end file data packet.

In examples, the size of the multiple data segments is based on the maximum transmission unit (MTU) of a particular data packet protocol, such as UDP. For instance, if the MTU of a UDP data packet is 'N' bytes, each data segment will be created at a size of approximately (but no larger than) 'N' bytes. Metadata is inserted into each of the multiple data segments to facilitate processing of the multiple data segments. Examples of data segment metadata include a file identifier, a file type, a content or section identifier, a transaction identifier, a file source indicator (e.g., the identifier of the first device), a data segment number, a data segment hash value, a data segment size or length, and a data segment offset.

In some embodiments of the present disclosure, the first device applies error correction techniques at the data chunk level and/or at the data segment level. As one example, erasure coding may be applied to each data chunk. Erasure coding, as used herein, refers to a method of data protection in which data is segmented, expanded, encoded with redundant data, and stored in multiple locations. In this example, applying erasure coding to a data chunk may cause data segments (or portions of data segments) in the data chunk to be encoded with redundant data and copied to one or more other data segments and/or data chunks.

The data packets comprising the data segments that compose the data chunks are transmitted to a second device in a second computing environment of the OWT system. In examples, the second device is separated from the first device by at least one boundary of the OWT system. The second device uses the metadata in the received data chunks and data segments to reconstruct the file. In some examples, the second device validates the integrity of the reconstructed file based on the metadata. If the second device determines that a data chunk or a data segment of the file cannot be validated (e.g., due to data loss or corruption), error correction techniques are applied to reconstruct or retrieve missing or corrupted data. As one example, Reed-Solomon codes may be used to reconstruct data missing from a data segment. A Reed-Solomon code refers to a mathematical formula used to enable the regeneration of missing data from pieces of known data (parity blocks).

After reconstructing the file, the second device transmits the reconstructed file to a third computing environment of the OWT system. In examples, the third computing environment is separated from the first computing environment and the second computing environment by at least one boundary of the OWT system. The metadata of the reconstructed file is used to transmit the reconstructed file to a destination endpoint.

As such, the present disclosure provides a plurality of technical benefits and improvements over previous OWT data transmission solutions. These technical benefits and improvements include, among other, creating and implementing a UDP-based protocol for OWT systems, applying error correction techniques at the data chunk level and/or at the data segment level to files transmitted using OWT systems, segmenting and reconstructing files transmitted in OWT systems such that data in the files is not exposed outside of the OWT systems, and providing for more resilient data transfer and improved data integrity in secure environments without compromising data security.

Figure 1B:
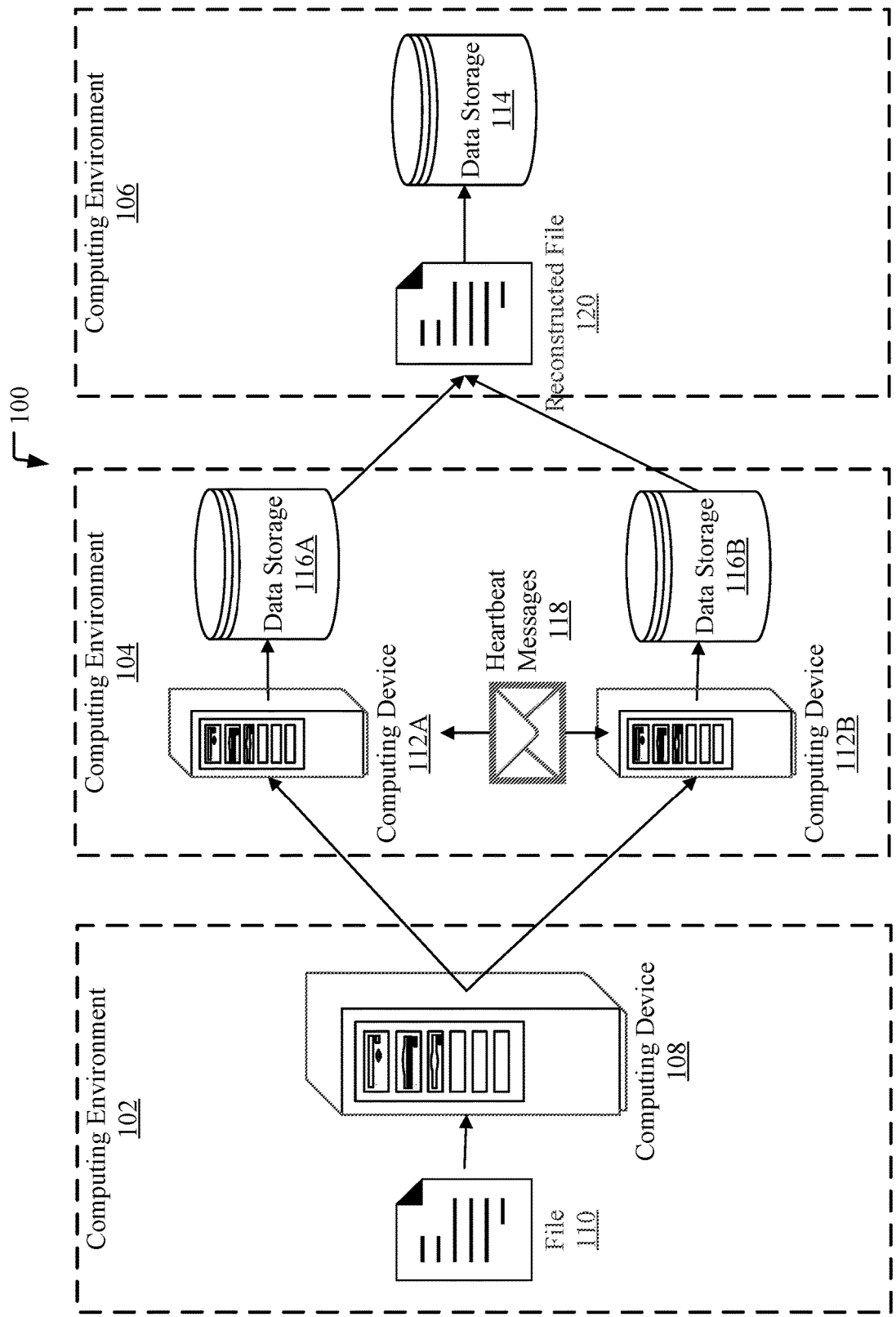

FIGS. 1A and 1B illustrate a system that implements UDP file serialization in an OWT system. System 100, as presented, is a combination of interdependent components that interact to form an integrated whole. Components of system 100 may be hardware components or software components (e.g., application programming interfaces (APIs), modules, runtime libraries) implemented on and/or executed by hardware components of system 100. In one example, components of system 100 are distributed across multiple processing devices or computing systems.

In FIGS. 1A and 1, system 100 represents an OWT system for transmitting files between different computing environments. System 100 comprises computing environments 102, 104, and 106. In examples, computing environments 102, 104, and 106 are implemented in a cloud computing environment or another type of distributed computing environment and are subject to one or more distributed computing models/services (e.g., Infrastructure as a Service (IaaS), Platform as a Service (PaaS), Software as a Service (SaaS), Functions as a Service (FaaS)). Although FIGS. 1A and 1B are depicted as comprising a particular combination of computing environments and devices, the scale and structure of devices and computing environments described herein may vary and may include additional or fewer components than those described in FIGS. 1A and 1B. Further, although examples in FIGS. 1A, 1B, and subsequent figures will be described in the context of OWT systems and file transfers between computing environments in which at least one computing environment is considered low-trust by another computing environment, the examples are equally applicable to non-OWT systems and other types of data transfers between computing environments of various (or the same) types, trust levels, and security levels. For instance, the examples are applicable to data transfers between computing environments in which devices executing in one or more the computing environments are trusted by devices executing within the other computing environments (e.g., the computing environments are high-trust with respect to each other).

In examples, computing environment 102 represents a low-trust computing environment in which devices executing within computing environment 102 are not trusted by devices executing within computing environments 104 or 106. In such examples, computing environment 102 may be physically separated from computing environments 104 and 106 such that computing environment 102 is in a first physical location (e.g., region, building, room, or rack) and computing environments 104 or 106 are in a different second physical location. Alternatively, computing environment 102 and computing environments 104 and/or 106 may share the same physical location.

With respect to FIG. 1A, computing environment 102 comprises computing device 108. Examples of computing device 108 include data diodes and server devices, such as web servers, file servers, application servers, and database servers. Computing device 108 receives and/or processes input data, such as file 110, from users or computing devices within or accessible to computing environment 102. File 110 may comprise one or more types of data, such as audio data, touch data, text-based data, gesture data, and/or image data. Computing device 108 serializes file 110 by separating file 110 into one or more data chunks using a file segmentation service or utility. The file segmentation service or utility is implemented locally on computing device 108 or is accessed remotely by computing device 108.

In one example, the size of the data chunks created from file 110 is based on the size of file 110. In such as an example, computing device 108 separates file 110 into a predefined quantity of data chunks (e.g., one, two, four, or ten) such that each data chunk stores the maximum amount of data that can be stored by the data chunk. For instance, if the predefined quantity of data chunks is set to four, a file 110 having a size of five megabytes is separated into four data chunks each having the same size of approximately 1.25 megabytes. In another example, the size of the data chunks created from file 110 is based on a predefined size limit. In such an example, computing device 108 separates file 110 into a predefined size of data chunks (e.g., 512 kilobytes or two megabytes) such that one or more data chunks (e.g., the last data chunk to be created) may store less than the predefined size. For instance, if the predefined size of data chunks is set to two megabytes, a file 110 having a size of five megabytes is separated into two two-megabyte data chunks and one one-megabyte data chunk.

Computing device 108 uses the file segmentation service or utility to further serialize file 110 by separating the data chunks into data segments. In examples, the size of the data segments is based on one or more attributes of data packets used to transmit data through system 100, such as MTU, data packet type/protocol, source and/or destination address, type of error detection/correction applied, and payload content type. For instance, if the MTU of a UDP data packet is 1500 bytes and each UDP data packet has 1472 available bytes (where 28 bytes are used or reserved for the UDP data packet header or other data fields), data segments will be created at a size of 1472 bytes. However, at least one data segment (corresponding to the end of the file) may be created at a size of less than 1472 bytes.

Computing device 108 inserts metadata into the data chunks and the data segments. In examples, the metadata is used to facilitate processing of the data chunks and the data segments in the correct order and to enable validation of the data chunks and/or the data segments. Examples of metadata inserted into a data chunk include a file identifier (e.g., a file name or a file link), a file format or type (e.g., text file, audio file, .doc file, .pdf file), a content or section identifier (e.g., characters or symbols indicating the start or end of content or content parts), a transaction identifier (e.g., a unique identifier for a file transmission request), a data chunk number (e.g., a value assigned to the data chunk), a data chunk hash value (e.g., a string of characters representing attributes and/or content of the data chunk), a data chunk size (e.g., a value indicating the amount of data stored in the data chunk), a data chunk length (e.g., a value indicating the quantity of characters, lines, or entries in the data chunk), and a data chunk offset (e.g., a value indicating the sequence order in which the data chunk was created). Examples of metadata inserted into a data segment include a file identifier, a file type, a content or section identifier, a transaction identifier, a file source indicator (e.g., an identifier of computing device 108), a data segment number (e.g., a value assigned to the data segment), a data segment hash value (e.g., a string of characters representing attributes and/or content of the data segment), a data segment size (e.g., a value indicating the amount of data stored in the data segment), a data segment length (e.g., a value indicating the number of characters, lines, or entries in the data segment), and a data segment offset (e.g., a value indicating the sequence order in which the data segment was created). In at least one example, metadata inserted into the data chunks and/or the data segments does not include or identify the destination endpoint for file 110.

In some examples, computing device 108 applies error correction techniques at the data chunk level and/or at the data segment level. The error correction techniques mitigate data packet loss and data corruption within data packets. In one example, computing device 108 implements erasure coding to segment file 110 into the data chunks and the data segments, encode the data chunks and/or the data segments with redundant data, and copy portions of the data chunks and/or the data segments to other data chunks and/or the data segments.

Computing device 108 transmits the data packets comprising the data segments that compose the data chunks to computing environment 104. In examples, computing environment 104 represents a high-trust computing environment that considers computing environment 102 to be low-trust. Computing environment 104 comprises computing device 112. Examples of computing device 112 include those devices described above with respect to computing device 108. In some examples, computing device 112 is located proximate to computing device 108 (e.g., in the same building or room). For instance, computing device 112 and computing device 108 may be located in the same room of a data center such that computing device 108 is located in a first data rack (e.g., server rack or data cabinet) and the computing device 112 is located in a second data rack or a different shelf of the first data rack. In such an example, computing device 112 and computing device 112 may be directly connected via point-to-point cabling. In other examples, computing device 112 is located remotely from computing device 108 (e.g., in a different building or room).

Computing device 112 receives data packets associated with file 110 from computing device 108. Computing device 112 reconstructs file 110 from the data packets based on the metadata added to the data chunks and/or data segments. For example, the data segment offset values inserted into the data segments are used to determine the sequence order of data segments within the data chunks, the data chunk offset values inserted into the data chunks are used to determine the sequence order of data chunks within file 110, and the transaction identifiers in the data chunks and data segments are used to correlate the data chunks and data segments to file 110.

In some examples, prior to or during reconstruction of file 110, computing device 112 determines whether a requisite quantity (e.g., all or at least a threshold percentage) of the data segments associated with file 110 have been received from computing device 108. Computing device 112 also validates the data chunks and/or data segments for file 110. If it is determined that at least a portion of one or more data segments was not received or it is determined that one or more data chunks and/or data segments cannot be validated, computing device 112 performs error correction to reconstruct or retrieve the missing data. For instance, computing device 112 may use a forward error technique, such as an erasure code, to reconstruct a data chunk or a data segment. Alternatively, computing device 112 may retrieve a data chunk or data segment comprising the missing data from another device (e.g., computing device 108 or an alternative device in computing environment 104).

After reconstructing file 110 from the received data packets, computing device 112 transmits reconstructed file 120 to computing environment 106. In some examples, computing environment 106 considers computing environments 102 and/or 104 to be low-trust. In other examples, computing environment 106 represents a computing environment having a security level that is the same as or is lower than the security levels of computing environments 102 and/or 104. Computing environment 106 comprises data storage 114. Examples of data storage 114 include direct-attached storage devices (e.g., hard drives, solid-state drives, and optical disk drives), network-based storage devices (e.g., storage area network (SAN) devices and network-attached storage (NAS) devices), and other types of memory devices. Data storage 114 receives and stores reconstructed file 120. In some examples, data storage 114 provides reconstructed file 120 to a destination endpoint or to another device that facilitates delivery of reconstructed file 120 to a destination endpoint.

With respect to FIG. 1B, similar to FIG. 1A, computing environment 102 comprises computing device 108. Computing device 108 processes file 110, separates file 110 into data chunks and corresponding data segments, applies error correction techniques, and transmits the data packets for file 110 to computing environment 104, as described in FIG. 1A.

In FIG. 1B, computing environment 104 comprises computing devices 112A and 112B and temporary data storage 116A and 116B. Examples of computing devices 112A and 112B include those devices described with respect to computing device 112 in FIG. 1A. In some examples, computing device 112A is located proximate to computing device 112B (e.g., in the same room or data rack). Additionally, computing devices 112A and/or 112B may be located proximate to computing device 108. For instance, computing devices 108, 112A, and 112B may each be stored in a separate data rack within the same room of a data center such that computing device 108 is directly connected via point-to-point cabling to computing devices 112A and 112B.

In examples, computing devices 112A and 112B provide data redundancy for data transferred across system 100. For instance, one of computing devices 112A and 112B is designated as the primary device and the other of computing devices 112A and 112B is designated as the secondary device. The primary device is used to transmit a reconstructed file to a collection point, such as data storage 114, and the secondary device is used to provide redundancy support for the primary device. As such, each of computing devices 112A and 112B receives data packets associated with file 110 from computing device 108. In some examples, at least one of computing devices 112A and 112B (e.g., the primary device) determines whether the requisite quantity of the data segments associated with file 110 have been received by that computing device. If the computing device determines that the requisite quantity of the data segments associated with file 110 has not been received, the computing device attempts to retrieve the missing data segments from another device (e.g., computing device 108 or the secondary device).

For instance, in some examples, computing devices 112A and 112B periodically transmit heartbeat messages 118 to each other. Heartbeat messages 118 include transmission information for one or more time periods, such as the time between a current heartbeat message and a previous heartbeat message. Examples of transmission information include the quantity of files transmitted during the time period, a list of data chunks and/or data segments transmitted in each file, a transaction identifier for each file transmitted, file transmission metrics (e.g., average or maximum time to transfer files, or average or maximum file size), the number of data packets lost during transmission, the number of files for which error correction was performed, the success rate of performing error correction performed, and the role of the computing device (e.g., primary device or secondary device). In such examples, a primary device of computing devices 112A and 112B evaluates heartbeat messages 118 received from a secondary device of computing devices 112A and 112B to determine whether the secondary device received the missing data segments. If the secondary device is determined to have received the missing data segments, the primary device requests the missing data segments from the secondary device.

In one alternative example, the primary device may provide data segments received by the primary device to the secondary device. For instance, upon determining that the secondary device received more of the data segments for file 110 than the primary device received, the primary device provides to the secondary device any data segments received by the primary device but not received by the secondary device. In such an example, transmitting the data segments from the primary device to the secondary device (as opposed to transmitting the data segments from the secondary device to the primary device) reduces the bandwidth and CPU processing required to transmit the data segments. In another alternative example, upon determining that the secondary device received more of the data segments for file 110 than the primary device received, the primary device designates the secondary device as the primary device (thereby, designating itself as the secondary device) at least for the purpose of transmitting file 110. In such an example, the secondary device continues to be designated as the primary device after file 110 has been processed and transmitted through system 100 or the secondary device is redesignated as the secondary device.

In examples, in response to determining that at least one of computing devices 112A and 112B received or has access to the requisite quantity of data segments for file 110, the primary device (and/or the secondary device) validates the data chunks and/or data segments received for file 110. Alternatively, at least one of computing devices 112A and 112B validates the data chunks and/or data segments for file 110 prior to or instead of determining that the requisite quantity of data segments has been received by computing devices 112A and/or 112B. Validating the data chunks and/or data segments may comprise evaluating the data chunk hash values and/or the data segment hash values for file 110. As one example, the primary device may generate a hash value for a received data chunk of file 110 using a hash function or similar utility. A hash function refers to a mathematical function used to map data of an arbitrary size to fixed-size values. The hash function may be the same as or similar to the hash function used by computing device 108 to create the hash values inserted into the data chunks and/or the data segments. The primary device compares the two hash values for the data chunk (e.g., the hash value created by the primary device and the hash value created by computing device 108) to determine whether the two hash values match. If the comparison identifies that the two hash values match, the data chunk is considered validated. If the comparison identifies that the two hash values do not match, the primary device performs an error correction process to attempt to reconstruct the data chunk. In some examples, the error correction process comprises executing an erasure code (e.g., Reed-Solomon code, Parchive code, or any other erasure-resilient maximal distance separation (MDS) codes) to recreate data chunks and/or data segments.

After determining the requisite quantity of data segments for file 110 has been received and/or validating the data chunks and/or data segments, at least one of computing devices 112A and 112B reconstructs file 120 from the data packets based on the metadata added to the data chunks and/or data segments. For example, the data segment offset values inserted into the data segments are used to determine the sequence order of data segments within the data chunks, the data chunk offset values inserted into the data chunks are used to determine the sequence order of data chunks within file 110, and the transaction identifiers in the data chunks and data segments are used to correlate the data chunks and data segments to file 110.

While the file is being reconstructed, computing devices 112A and 112B store a reconstructed portion of file 110 in respective temporary data storage 116A and 116B. Examples of temporary data storage 116A and 116B include random access memory and cache. If the primary device successfully reconstructs reconstructed file 120, the primary device transmits reconstructed file 120 to data storage 114 and notifies the secondary device (e.g., via a heartbeat message 118) that reconstructed file 120 has been successfully transferred. Computing devices 112A and 112B then remove the reconstructed portion of file 110 (or the reconstructed file 120) from their respective data storage 116A and 116B. However, if the primary device cannot successfully reconstruct reconstructed file 120 or the primary device does not notify the secondary device that reconstructed file 120 has been successfully transferred within an expected time period, the secondary device transmits reconstructed file 120 to data storage 114. The secondary device then notifies the primary device that reconstructed file 120 has been successfully transferred and computing devices 112A and 112B remove the reconstructed portion of file 110 (or the reconstructed file 120) from their respective data storage 116A and 116B.

Similar to FIG. 1A, computing environment 106 comprises data storage 114. Data storage 114 receives reconstructed file 120 and may provide reconstructed file 120 to a destination endpoint or to another device, as described in FIG. 1A.

Figure 2:
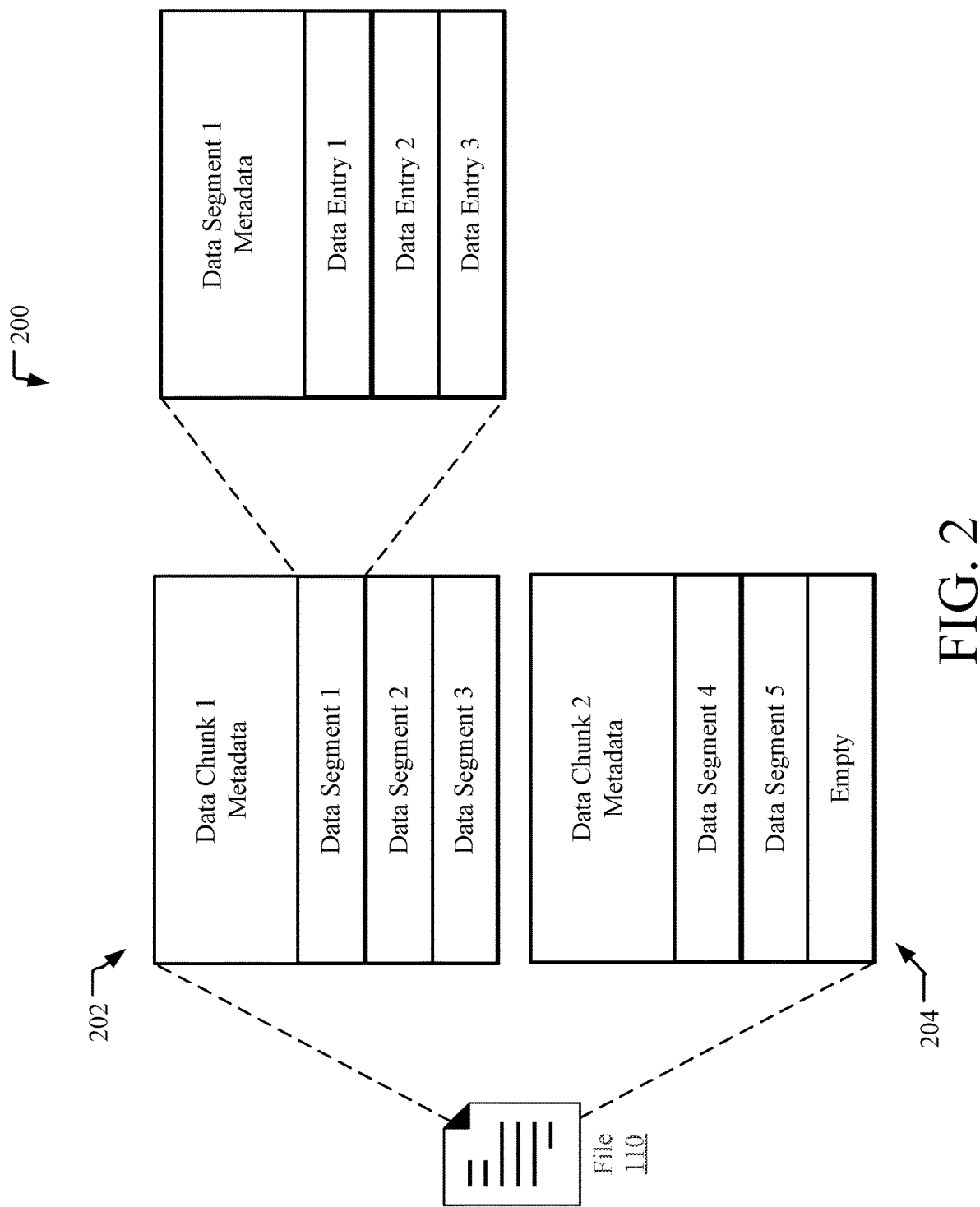
FIG. 2 illustrate an example file segmented into data chunks and data segments according to the UDP file serialization techniques described herein.

FIG. 2 illustrates an example file segmented into data chunks and data segments according to the UDP file serialization techniques described herein. In FIG. 2, file 110 is segmented into data chunks 202 and 204, which collectively comprise the entire content of file 110. Data chunk 202 comprises data chunk 1 metadata, data segment 1, data segment 2, and data segment 3. Data chunk 1 metadata comprises, for example, a file identifier (e.g., "File 1"), a transaction identifier (e.g., "transaction 215"), a data chunk number (e.g., 1), a data chunk hash value (e.g., "MNUHK3TLNBQXG2BR"), a data chunk size (e.g., 5000 bytes), and a data chunk offset (e.g., 0). In examples, the metadata of data chunks 202 and 204 is stored in data fields in the header of the respective data chunk.

Each of data segments 1, 2, and 3 comprises metadata and one or more data entries. For example, data segment 1 comprises data segment 1 metadata, data entry 1, data entry 2, and data entry 3. Data segment 1 metadata comprises, for example, a file identifier (e.g., "File 1"), a transaction identifier (e.g., "transaction 215"), a file source indicator (e.g., computing device 112A), a data segment number (e.g., 1), a data segment hash value (e.g., "ONSWO3LFNZ2GQYLTNAYQ===="), a data segment size (e.g., 1500 bytes), and a data segment offset (e.g., 0). In examples, the metadata of data segments 1, 2, 3, 4, and 5 is stored in data fields in the header of the respective data segment. Examples of data entries include text, numerical values, columnar data, image data, and audio data.

Data chunk 204 comprises data chunk 2 metadata, data segment 4 and data segment 5. Data chunk 2 metadata comprises, for example, a file identifier (e.g., "File 1"), a transaction identifier (e.g., "transaction 215"), a data chunk number (e.g., 2), a data chunk hash value (e.g., "MNUHK3TLNBQXG2BS"), a data chunk size (e.g., 7000 bytes), and a data chunk offset (e.g., 1). In some examples, each data chunk is created at a static size such that the size of the data chunk is unaffected if the data chunk includes less than the maximum amount of data segments that could be included in the data chunk. For instance, the size of a data chunk that can include a maximum of three data segments does not change when the data chunk includes less than three data segments. Instead, as depicted by data chunk 204, the data chunk will include empty (e.g., unused) space. In other examples, each data chunk is created at a dynamic size that does not exceed the maximum size set for the data chunk. For instance, the size of a data chunk that can include a maximum of three data segments is reduced from the maximum size for the data chunk when the data chunk includes less than three data segments.

Having described systems that may be employed by the embodiments disclosed herein, methods that may be performed by such systems are now provided. Although methods 300-500 are described in the context of system 100 of FIGS. 1A and 1, the performance of methods 300-500 are not limited to such examples.

Figure 3:
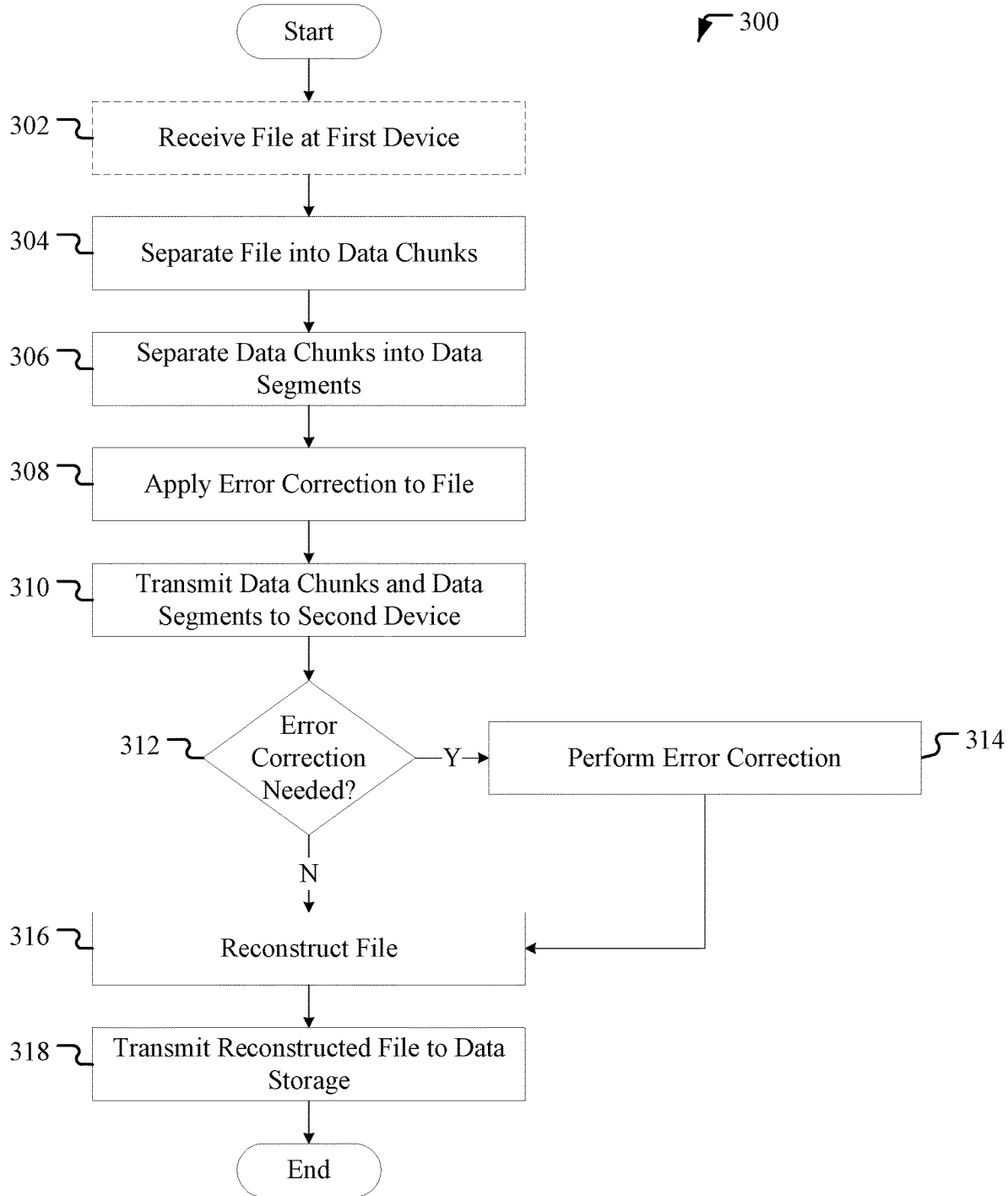
FIG. 3 illustrates an example method for UDP file serialization in an OWT system.

FIG. 3 illustrates a method 300 for UDP file serialization in an OWT system. In examples, the OWT system comprises multiple computing environments that utilize an application-layer protocol built on UDP to transfer data through the system. One or more of the computing environments may differ in trust level, security level, or physical location. For instance, in some embodiments, one of the computing environments is a low-security environment and another of the computing environments is a high-security environment. In some embodiments, the OWT system is configured such that a source endpoint and/or a destination endpoint of data transmitted through the OWT is unknown to one or more of the computing environments.

Method 300 begins at optional operation 302, where a file, such as file 110, is received at a first device, such as computing device 108. In examples, the first device is a data diode and/or is located in a first computing environment of an OWT system, such as computing environment 102. The file originates at a source endpoint in the first computing environment, or the file is provided to the first computing environment from an external source endpoint. As one example, file 110 may be a video file that is generated by a video capture device implemented in the first computing environment. The video capture device may transmit the video file to the first device as part of a secure data transfer request by an operator of the video capture device.

At operation 304, the first device serializes the file by separating the file into one or more data chunks. Separating the file into data chunks comprises applying to the file a file segmentation service or utility that is implemented on the first device or accessible remotely by the first device. In some examples, the number and/or size of the data chunks created from the file is based on the size of the file. For instance, a set of rules or other decision logic may dictate that each file in a particular range of file sizes (e.g., less than two megabytes, between two megabytes and twenty megabytes, larger than twenty megabytes) is to be separated into at least (or no more than) a specific quantity of data chunks or separated into a specific size of data chunks. In other examples, the quantity and/or size of the data chunks created from the file is based on a predefined value. For instance, the set of rules or decision logic may dictate that each file (regardless of size) will be separated into 'N' data chunks (e.g., two data chunks) or 'N'-sized data chunks (e.g., two megabytes).

Metadata is inserted into the data chunks to facilitate reconstruction of the file. Examples of the of the metadata inserted into the data chunks include a file identifier for the file, a file format or type of the file, a content or section identifier for the file, a transaction identifier for the request to transmit the file through the OWT system, a data chunk number for the data chunk, a data chunk hash value for the data chunk, a data chunk size for the data chunk, a data chunk length for the data chunk, and a data chunk offset for the data chunk. The metadata may be inserted into the header of a data chunk, inserted into the body of a data chunk, provided along with a data chunk, or some combination thereof. In examples, a predefined data size is reserved in the data chunk for the metadata and the remainder of the size of the data chunk is reserved for other data, such as data segments and/or error correction data.

At operation 306, the first device further serializes the file by separating the data chunks into one or more data segments. Separating the file into data segments comprises applying the file segmentation service or utility to the file. In some examples, the size of the data segments created for the data chunks is based on one or more attributes of data packets used to transmit data through the OWT system (e.g., MTU, data packet type or protocol, or error correction applied). For instance, the size of the data segments may be based on the MTU of a protocol data unit (e.g., a UDP data packet). In other examples, the size of the data segments created for the data chunks is based on a predefined value (e.g., 5000 bytes or one megabyte).

Metadata is inserted into the data segments to facilitate reconstruction of the file. Examples of the of the metadata inserted into the data segments include a file identifier for the file, a file format or type of the file, a content or section identifier for the file, a transaction identifier for the request to transmit the file through the OWT system, a file source indicator for the file, a data segment number for the data segment, a data segment hash value for the data segment, a data segment size for the data segment, a data segment length for the data segment, and a data segment offset for the data segment. The metadata may be inserted into the header of a data segment, inserted into the body of a data segment, provided along with a data segment, or some combination thereof. In examples, a predefined data size is reserved in the data segment for the metadata and the remainder of the size of the data segment is reserved for other data, such as data entries from the file and/or error correction data.

At operation 308, the first device applies error correction to the file. In examples, the error correction is applied at the data chunk level and/or at the data segment level to mitigate data packet loss and data corruption within data chunks and data segments. For instance, erasure coding may be applied to the file to encode the data chunks and/or the data segments with redundant data, and to copy portions of the data chunks and/or the data segments to other data chunks and/or the data segments.

At operation 310, the first device transmits the data chunks and the data segments of the file to a second device. In examples, a second device, such as computing device 112, is located in a second computing environment of the OWT system, such as computing environment 104. Although the second computing environment may be logically distinct from the first computing environment, the second device may be physically located proximate to the first device. For instance, first device and the second device may be located in the same building, the same room, or the same data rack. Alternatively, the second device may be physically located distant from the first device (e.g., in a different region or building).

At decision operation 312, the second device determines whether error correction is to be performed for the received data chunks and the data segments of the file. In some examples, determining whether to perform error correction comprises determining whether a requisite quantity of the data segments associated with the file have been received from the first device. The requisite quantity may correspond to a percentage (e.g., 98%) of data segments for a file. Alternatively, the requisite quantity may indicate that no more than a particular quantity of consecutive data segments (e.g., three data segments) was not received from the first device. In such an example, the particular quantity of consecutive data segments may be based on the type of error correction applied to the file. If it is determined that error correction does not need to be performed for the received data chunks and the data segments of the file, method 300 proceeds to operation 316. However, if it is determined that error correction needs to be performed for the received data chunks and the data segments of the file, method 300 proceeds to operation 314.

At operation 314, the second device performs error correction. For example, if it is determined that a requisite quantity of the data segments associated with the file have not been received, the second device attempts to retrieve the missing data segments (i.e., data segments that have not been received) from the first device. Alternatively, the second device attempts to retrieve the missing data segments from another device in the second computing environment. For instance, if the second device is arranged in a data redundancy scenario such that the second device is acting as a primary device, such as computing device 112A, and a third device is acting as a secondary device, such as computing device 112B, the second device and the third device separately receive the data chunks and the data segments of the file from the first device. In this scenario, the second device attempts to retrieve the missing data segments from the third device.

In response to (or instead of) determining that a requisite quantity of the data segments associated with the file have been received, the second device (or the third device) validates the data chunks and/or data segments received for the file. Validating the data chunks and/or data segments may comprise evaluating the metadata inserted into the data chunks and/or data segments. As one example, the second device generates a hash value for a received data chunk and compares the generated hash value to the hash value stored in the metadata for the data chunk. If the two hash values for the data chunk match, the received data chunk is considered validated. If the two hash values for the data chunk do not match, the second device performs an error correction process to reconstruct the data chunk. In some examples, the error correction process comprises executing an erasure code to recreate data chunks and/or data segments.

At operation 316, the second device reconstructs the file from the data segments and the data chunks of the file. Reconstructing the file comprises using the metadata added to the data chunks and/or data segments to determine an order of reconstruction. For example, data segment offset values inserted into the data segments are used to determine the sequence order of data segments within the data chunks, data chunk offset values inserted into the data chunks are used to determine the sequence order of data chunks within the file, and transaction identifiers in the data chunks and data segments are used to correlate the data chunks and data segments to the file.

At operation 318, the second device transmits the reconstructed file to data storage, such as data storage 114. In examples, the data storage is located in a third computing environment of the OWT system, such as computing environment 106. The data storage may serve as a collection point for one or more devices within or external to the OWT system. In at least one example, prior to transmitting the reconstructed file to the data storage, the second device removes the metadata inserted by the first device into the data chunks and/or data segments. As such, the original state of the file (e.g., the state of the file as it was received by the first device) is maintained and no information relating to the processing of the file in the first computing environment or the second computing environment is exposed to the third computing environment or to an entity external to the OWT system.

Figure 4:
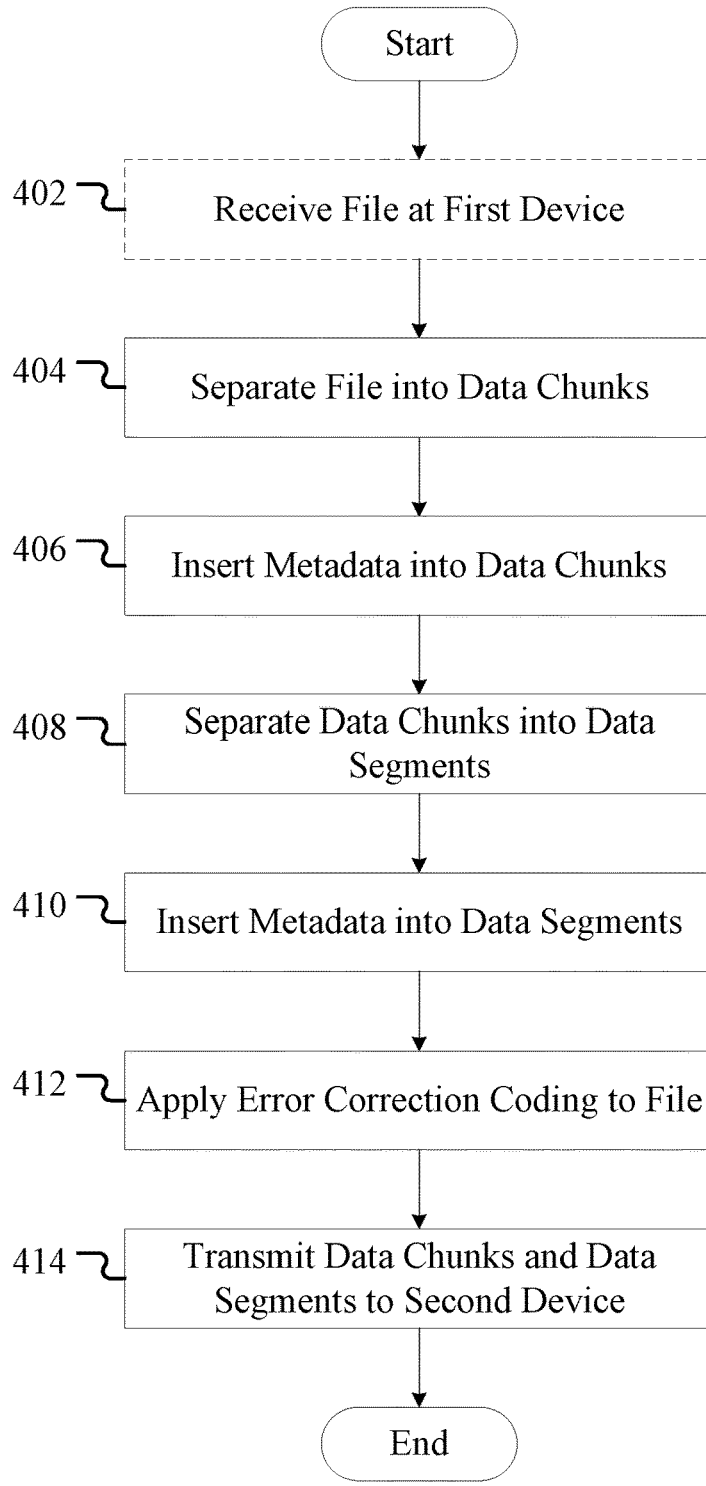
FIG. 4 illustrates an example method for UDP file serialization in a first computing environment of an OWT system.

FIG. 4 illustrates a method 400 for implementing UDP file serialization in a first computing environment of an OWT system. Method 400 begins at optional operation 402, where a file, such as file 110, is received at a first device, such as computing device 108. In examples, the first device is located in a first computing environment of an OWT system, such as computing environment 102. The file originates at a source endpoint in the first computing environment, or the file is provided to the first computing environment from an external source endpoint.

At operation 404, the first device separates the file into one or more data chunks. Separating the file into data chunks comprises applying to the file a file segmentation service or utility that is implemented on the first device or accessible remotely by the first device. In some examples, the number and/or size of the data chunks created from the file is based on the size of the file. For instance, a set of rules or other decision logic may dictate that each file in a particular range of file sizes (e.g., less than two megabytes, between two megabytes and twenty megabytes, larger than twenty megabytes) is to be separated into at least (or no more than) a specific quantity of data chunks or separated into a specific size of data chunks. In other examples, the quantity and/or size of the data chunks created from the file is based on a predefined value. For instance, the set of rules or decision logic may dictate that each file (regardless of size) will be separated into 'N' data chunks (e.g., two data chunks) or 'N'-sized data chunks (e.g., two megabytes).

At operation 406, the first device inserts metadata into the data chunks. Inserting the metadata into the data chunks facilitates reconstruction of the file and/or transfer of the file to a destination endpoint. Examples of the of the metadata inserted into the data segments include a file identifier for the file, a file format or type of the file, a content or section identifier for the file, a transaction identifier for the request to transmit the file through the OWT system, a file source indicator for the file, a data segment number for the data segment, a data segment hash value for the data segment, a data segment size for the data segment, a data segment length for the data segment, and a data segment offset for the data segment. The metadata may be inserted into the header of a data segment, inserted into the body of a data segment, provided along with a data segment, or some combination thereof. In examples, a predefined data size is reserved in the data segment for the metadata and the remainder of the size of the data segment is reserved for other data, such as data entries from the file and/or error correction data.

At operation 408, the first device separates the data chunks into one or more data segments. Separating the file into data segments comprises applying the file segmentation service or utility to the file. In some examples, the size of the data segments created for the data chunks is based on one or more attributes of data packets used to transmit data through the OWT system (e.g., MTU, data packet type or protocol, or error correction applied). For instance, the size of the data segments may be based on the MTU of a protocol data unit (e.g., a UDP data packet). In other examples, the size of the data segments created for the data chunks is based on a predefined value (e.g., 5000 bytes or one megabyte).

At operation 410, the first device inserts metadata into the data segments. Inserting the metadata into the data segments further facilitates reconstruction of the file and/or transfer of the file to a destination endpoint. Examples of the of the metadata inserted into the data segments include a file identifier for the file, a file format or type of the file, a content or section identifier for the file, a transaction identifier for the request to transmit the file through the OWT system, a file source indicator for the file, a data segment number for the data segment, a data segment hash value for the data segment, a data segment size for the data segment, a data segment length for the data segment, and a data segment offset for the data segment. The metadata may be inserted into the header of a data segment, inserted into the body of a data segment, provided along with a data segment, or some combination thereof. In examples, a predefined data size is reserved in the data segment for the metadata and the remainder of the size of the data segment is reserved for other data, such as data entries from the file and/or error correction data.

At operation 412, the first device applies error correction coding to the file. In examples, the error correction coding is applied at the data chunk level and/or at the data segment level to mitigate data packet loss and data corruption within data chunks and data segments. For instance, erasure coding may be applied to the file to encode the data chunks and/or the data segments with redundant data. The erasure coding may also copy portions of the data chunks and/or the data segments to other data chunks and/or the data segments.

At operation 414, the first device transmits the data chunks and the data segments of the file to a second device. In examples, the second device is located in a second computing environment of the OWT system, such as computing environment 104. Although the second computing environment may be logically distinct from the first computing environment, the second device may be physically located proximate to the first device. For instance, first device and the second device may be located in the same building, the same room, or the same data rack. Alternatively, the second device may be physically located distant from the first device (e.g., in a different region or building).

Figure 5:
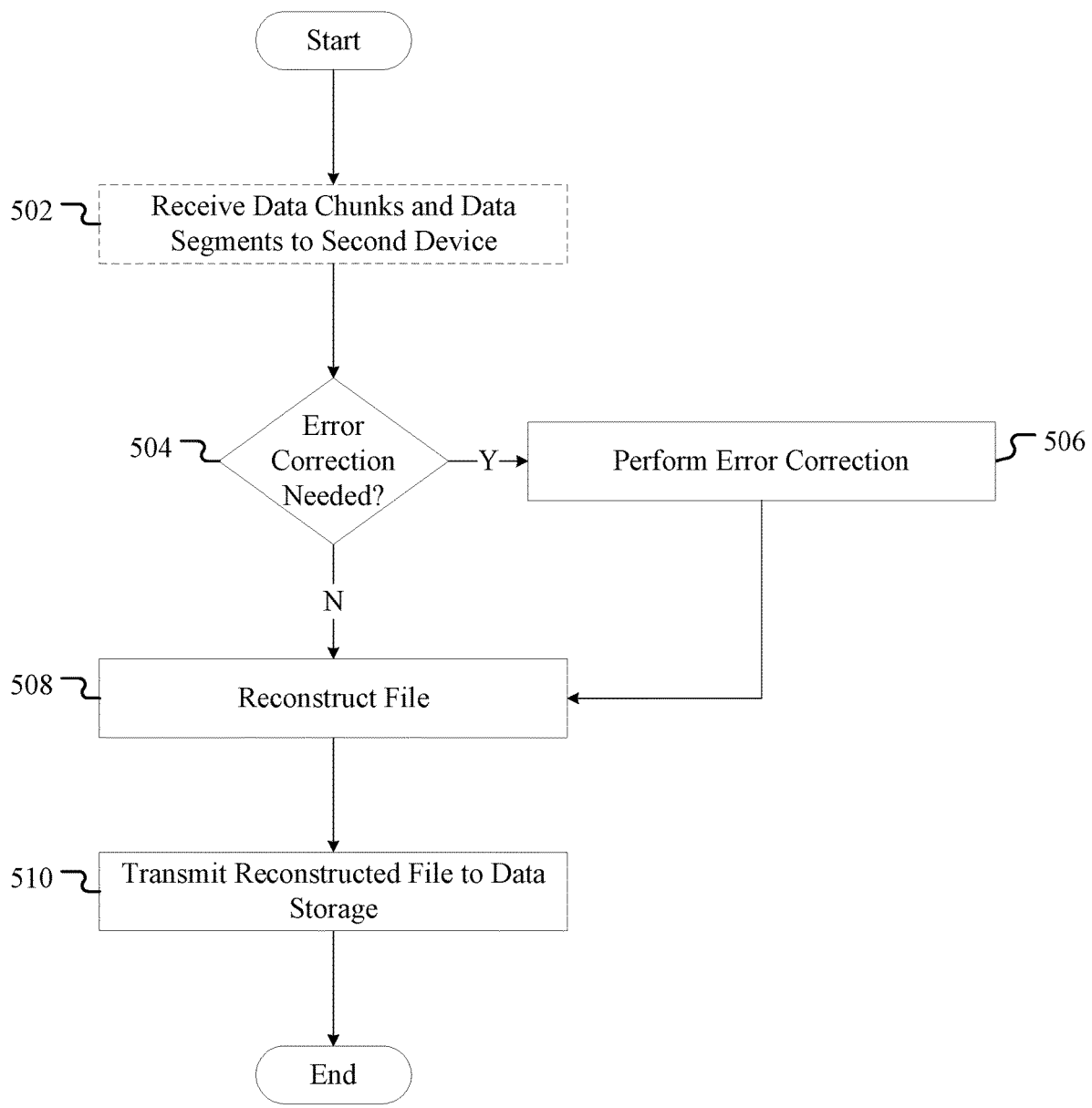
FIG. 5 illustrates an example method for UDP file serialization in a second computing environment of an OWT system.

FIG. 5 illustrates a method 500 for implementing UDP file serialization in a second computing environment of an OWT system. Method 500 begins at optional operation 502, where the data chunks and the data segments of a file, such as file 110, are received at a second device, such as computing device 112. In examples, the second device is located in a second computing environment of an OWT system, such as computing environment 104. The data chunks and the data segments are received from a first device, such as computing device 108, that is implemented in a first computing environment of the OWT system, such as computing environment 102. In some examples, the data chunks and the data segments respectively comprise data and/or metadata facilitating the reconstruction of the file (e.g., recombining the data chunks and the data segments into the file or into a reconstructed file corresponding to the file).

At decision operation 504, the second device determines whether error correction is to be performed for the data chunks and the data segments of the file. In some examples, determining whether to perform error correction comprises determining whether a requisite quantity of the data segments associated with the file have been received from the first device. The requisite quantity may correspond to a percentage (e.g., 98%) of data segments for a file. Alternatively, the requisite quantity may indicate that no more than a particular quantity of consecutive data segments (e.g., three data segments) was not received from the first device. In such an example, the particular quantity of consecutive data segments may be based on the type of error correction applied to the file. If it is determined that error correction does not need to be performed for the received data chunks and the data segments of the file, method 500 proceeds to operation 508. However, if it is determined that error correction needs to be performed for the data chunks and the data segments of the file, method 500 proceeds to operation 506.

At operation 506, the second device performs error correction. For example, if it is determined that a requisite quantity of the data segments associated with the file have not been received, the second device attempts to retrieve the missing data segments (i.e., data segments that have not been received) from the first device. Alternatively, the second device attempts to retrieve the missing data segments from another device in the second computing environment. For instance, if the second device is arranged in a data redundancy scenario such that the second device is acting as a primary device, such as computing device 112A, and a third device is acting as a secondary device, such as computing device 112B, the second device and the third device separately receive the data chunks and the data segments of the file from the first device. In this scenario, the second device attempts to retrieve the missing data segments from the third device.

In response to (or instead of) determining that a requisite quantity of the data segments associated with the file have been received, the second device (or the third device) validates the data chunks and/or data segments received for the file. Validating the data chunks and/or data segments may comprise evaluating the metadata inserted into the data chunks and/or data segments. As one example, the second device generates a hash value for a received data chunk and compares the generated hash value to the hash value stored in the metadata for the data chunk. If the two hash values for the data chunk match, the received data chunk is considered validated. If the two hash values for the data chunk do not match, the second device performs an error correction process to reconstruct the data chunk. In some examples, the error correction process comprises executing an erasure code to recreate data chunks and/or data segments.

At operation 508, the second device reconstructs the file from the data segments and the data chunks of the file. Reconstructing the file comprises using the metadata added to the data chunks and/or data segments to determine an order of reconstruction. For example, data segment offset values inserted into the data segments are used to determine the sequence order of data segments within the data chunks, data chunk offset values inserted into the data chunks are used to determine the sequence order of data chunks within the file, and transaction identifiers in the data chunks and data segments are used to correlate the data chunks and data segments to the file.

At operation 510, the second device transmits the reconstructed file to data storage. In examples, a data storage, such as data storage 114, is located in a third computing environment of the OWT system, such as computing environment 106. The data storage may serve as a collection point for one or more devices within or external to the OWT system. In at least one example, prior to transmitting the reconstructed file to the data storage, the second device removes the metadata inserted by the first device into the data chunks and/or data segments. As such, the original state of the file (e.g., the state of the file as it was received by the first device) is maintained and no information relating to the processing of the file in the second computing environment is exposed to the third computing environment or to an entity external to the OWT system.

Figure 6:
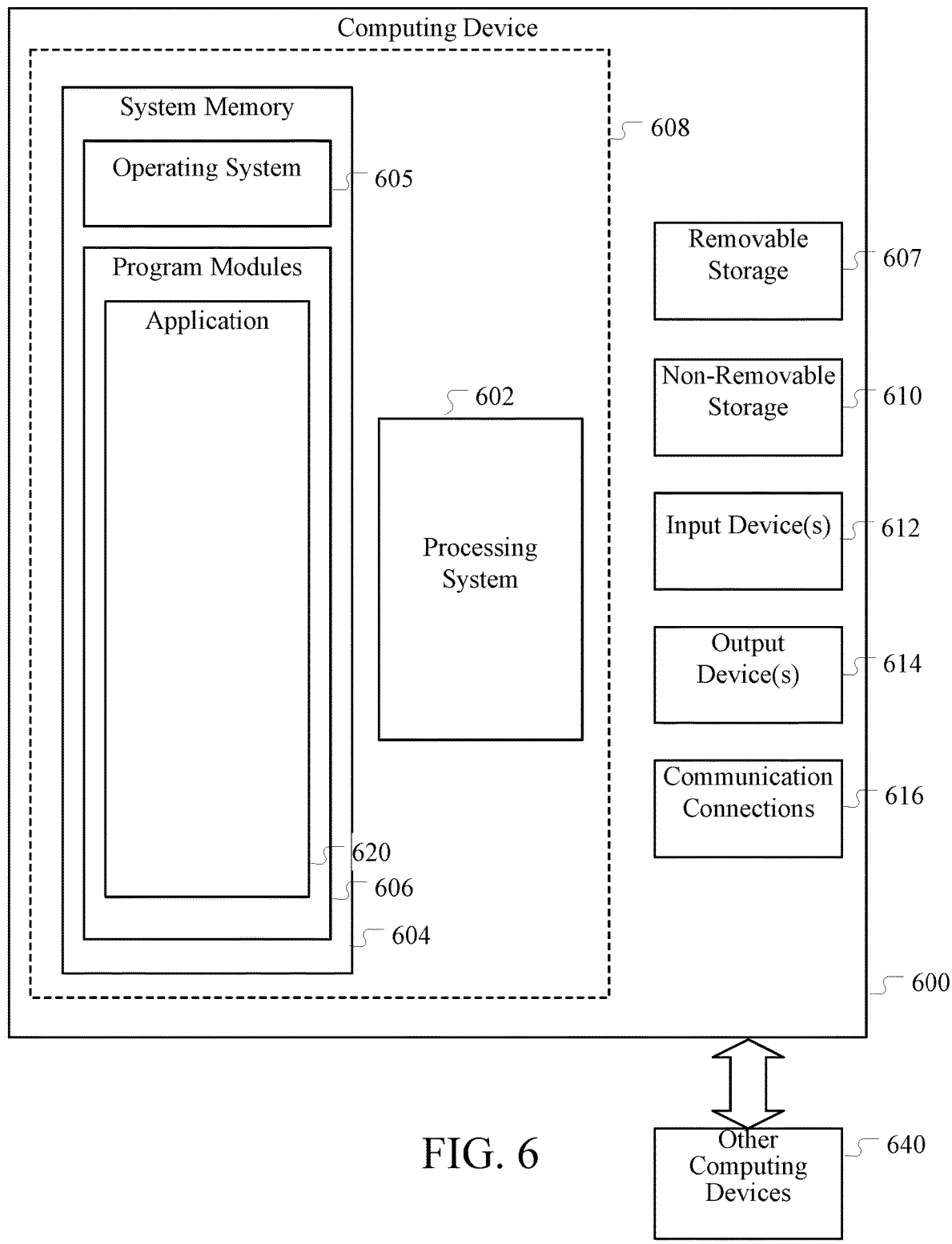
FIG. 6 is a block diagram illustrating example physical components of a computing device for practicing aspects of the disclosure.
Figure 7:
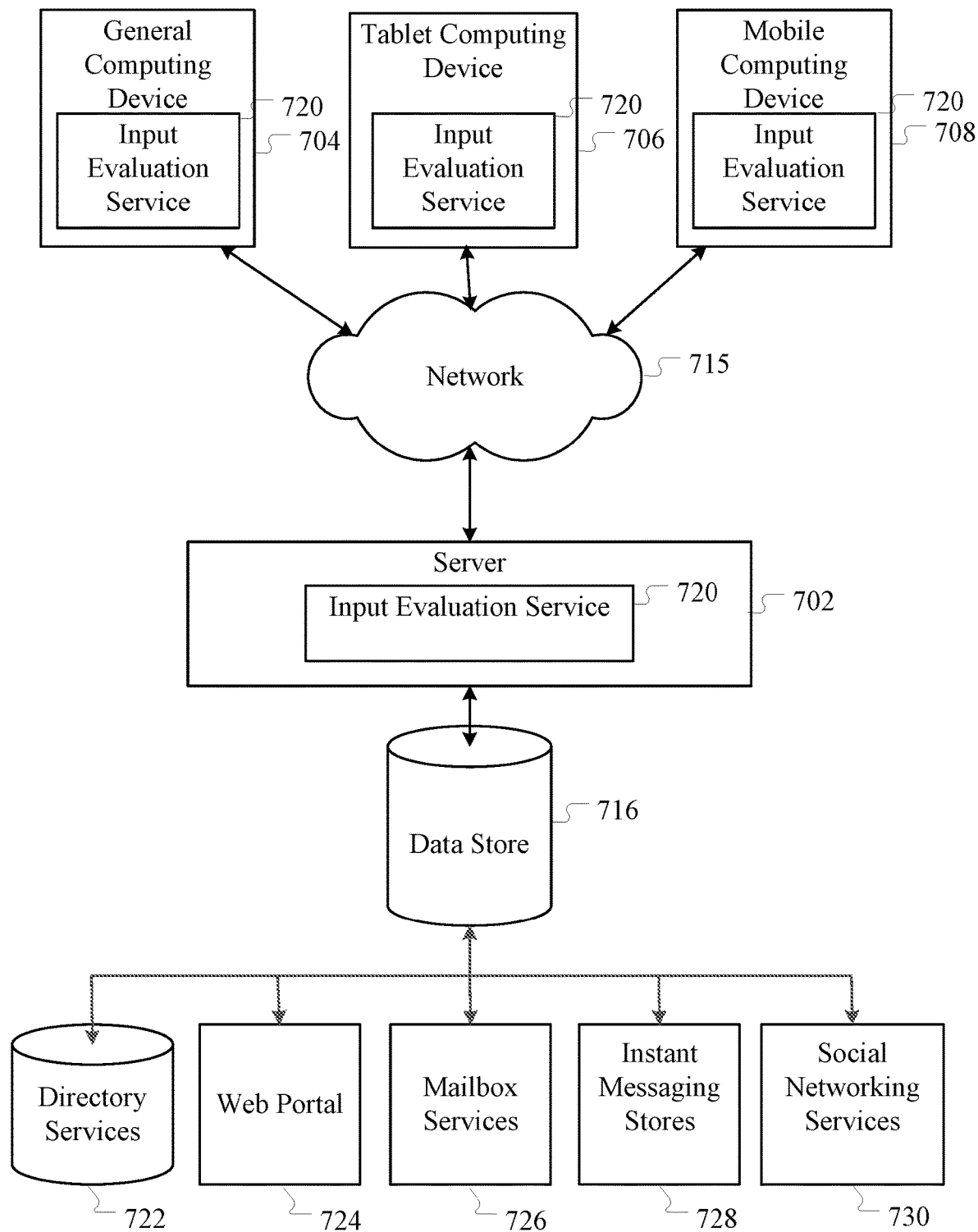
FIG. 7 is a simplified block diagram of an example distributed computing system for practicing aspects of the present disclosure.

FIGS. 6-7 and the associated descriptions provide a discussion of a variety of operating environments in which aspects of the disclosure may be practiced. However, the devices and systems illustrated and discussed with respect to FIGS. 6-7 are for purposes of example and illustration, and, as is understood, a vast number of computing device configurations may be utilized for practicing aspects of the disclosure, described herein.

FIG. 6 is a block diagram illustrating physical components (e.g., hardware) of a computing device 600 with which aspects of the disclosure may be practiced. The computing device components described below may be suitable for the computing devices and systems described above. In a basic configuration, the computing device 600 includes a processing system 602 comprising at least one processing system and a system memory 604. Depending on the configuration and type of computing device, the system memory 604 may comprise volatile storage (e.g., random access memory (RAM)), non-volatile storage (e.g., read-only memory (ROM)), flash memory, or any combination of such memories.

The system memory 604 includes an operating system 605 and one or more program modules 606 suitable for running software application 620, such as one or more components supported by the systems described herein. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, or optical disks. Such additional storage is illustrated in FIG. 6 by a removable storage device 607 and a non-removable storage device 610.

As stated above, a number of program modules and data files may be stored in the system memory 604. While executing on the processing system 602 comprising one or more processors, the program modules 606 (e.g., application 620) may perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing systems/units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include radio frequency (RF) transmitter, receiver, and/or transceiver circuitry; universal serial bus (USB), parallel, and/or serial ports.

The term computer readable media as used herein may include computer storage media. Computer storage media includes volatile and nonvolatile, removable and non-removable media implemented in any method or technology for storage of information, such as computer readable instructions, data structures, or program modules. The system memory 604, the removable storage device 607, and the non-removable storage device 610 are all computer storage media examples (e.g., memory storage). Computer storage media includes RAM, ROM, electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

FIG. 7 illustrates one aspect of the architecture of a system for processing data received at a computing system from a remote source, such as a personal computer 704, tablet computing device 706, or mobile computing device 708, as described above. The computing system is representative of the computing environments discussed above, such as computing environments 102, 104, and 106. For example, remote sources 704, 706, and 708 may be implemented in a first computing environment of an OWT system or may be implemented externally to the first computing environment of an OWT system. In either scenario, remote sources 704, 706, and 708 provide files and other data to the first computing environment and/or receive files and other data from one or more computing environments of the OWT system. Content displayed at server device 702 may be stored in different communication channels or other storage types. For example, various files and documents may be stored using a directory service 722, a web portal 724, a mailbox service 726, an instant messaging store 728, or a social networking site 730.

An input evaluation service 720 may be employed by a client that communicates with server device 702, and/or input evaluation service 720 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

As will be understood from the present disclosure, one example of the technology discussed herein relates to a system comprising: a processing system; and memory coupled to the processing system, the memory comprising computer executable instructions that, when executed, perform operations comprising: separating a file into multiple data chunks at a first device in a one-way transfer (OWT) system; separating each data chunk of the multiple data chunks into multiple data segments; providing the multiple data chunks and the multiple data segments to second device in the OWT system; and applying error correction coding to a data chunk of the multiple data chunks or a data segment of the multiple data segments.

In another example, the technology discussed herein relates to a system comprising: a processing system; and memory coupled to the processing system, the memory comprising computer executable instructions that, when executed, perform operations comprising: performing, at a first device in a one-way transfer (OWT) system, error correction for a data segment of a file that has been separated into multiple data segments, the data segment being included in the multiple data segments; reconstructing the multiple data segments into a reconstructed file based on metadata inserted into the multiple data segments; and transmitting the reconstructed file to a second device in the OWT system.

In another example, the technology discussed herein relates to a method comprising: receiving data at a first device in a one-way transfer (OWT) system; separating the data into one or more data chunks; separating the one or more data chunks into data segments; inserting metadata for reconstructing the data into the one or more data chunks and the data segments, the metadata comprising a transaction identifier associated with the data and respective hash values for the one or more data chunks and the data segments; transmitting the one or more data chunks and the data segments to a second device in the OWT system to be reconstructed; reconstructing the one or more data chunks and the data segments into a reconstructed file at the second device based on the metadata; and providing the reconstructed file to a third device in the OWT system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processing system; and
memory coupled to the processing system, the memory comprising computer executable instructions that, when executed, perform operations comprising:
separating a file into multiple data chunks at a first device in a one-way transfer (OWT) system, wherein separating the file into the multiple data chunks comprises inserting, into each data chunk of the multiple data chunks, a file identifier for the file and at least one of a data chunk identifier for the data chunk or a data chunk size for the data chunk;
separating each data chunk of the multiple data chunks into multiple data segments, wherein separating the file into the multiple data segments comprises inserting, into each data segment of the multiple data segments, the file identifier for the file, a data segment identifier for the data segment, and a data segment offset indicating a sequence order in which a respective data segment was created;
providing the multiple data chunks and the multiple data segments to a second device in the OWT system; and
applying error correction coding to a data chunk of the multiple data chunks or a data segment of the multiple data segments.

2. The system of claim 1, wherein the first device is located in a first computing environment of the OWT system and the second device is located in a second computing environment of the OWT system, the first computing environment being different from the second computing environment.

3. The system of claim 2, wherein the first computing environment is a low-trust environment in which devices in the first computing environment are not trusted by devices in the second computing environment.

4. The system of claim 1, wherein the first device provides the multiple data chunks and the multiple data segments to second device using User Datagram Protocol (UDP).

5. The system of claim 1, wherein the first device and the second device are located in a same physical location.

6. The system of claim 1, wherein a quantity of the multiple data chunks or a size of the multiple data chunks is based on a size of the file.

7. The system of claim 1, wherein a size of the multiple data segments is based on a maximum transmission unit (MTU) of a protocol data unit used to transfer data through the OWT system.

8. The system of claim 1, wherein separating the file into the multiple data chunks further comprises:
inserting into each data chunk a transaction identifier for a request to transmit the file through the OWT system.

9. The system of claim 8, wherein separating the file into the multiple data chunks further comprises at least one of:
a file format or type of the file; or
a content or section identifier for the file.

10. The system of claim 1, wherein applying the error correction comprises applying erasure coding to at least one of the multiple data chunks or the multiple data segments.

11. A method comprising:
separating a file into multiple data chunks at a first device in a one-way transfer (OWT) system, wherein separating the file into the multiple data chunks comprises inserting, into each data chunk of the multiple data chunks, a format or type of the file and a data chunk offset indicating a sequence order in which a respective data chunk was created;
separating each data chunk of the multiple data chunks into multiple data segments, wherein separating the file into the multiple data segments comprises inserting, into each data segment of the multiple data segments, the file identifier for the file, a data segment identifier for the data segment, and a data segment offset indicating a sequence order in which a respective data segment was created;
providing the multiple data chunks and the multiple data segments to second device in the OWT system; and
applying error correction coding to a data chunk of the multiple data chunks or a data segment of the multiple data segments.

12. The method of claim 11, wherein a data segmentation utility of the first device uses predefined decision logic to determine at least one of a number or a size of the data chunks to be created from the file.

13. The method of claim 12, wherein the predefined decision logic specifies a plurality of file size ranges and the at least one of the number or the size of the data chunks is selected based on a file size range associated with the size of the file.

14. The method of claim 12, wherein the predefined decision logic specifies a predefined value and defines the at least one of the number or the size of the data chunks.

15. The method of claim 11, wherein separating the file into the multiple data chunks further comprises inserting, into each data chunk of the multiple data chunks, a file source indicator for the file.

16. The method of claim 11, wherein a predefined data size is reserved in each data segment of the multiple data segments for the format or type of the file and the data chunk offset.

17. The method of claim 11, wherein a size of the multiple data segments is based on one or more attributes of data packets used by the first device to transmit data through the OWT system.

18. The method of claim 17, wherein the one or more attributes of the data packets include at least one of:
a maximum transmission unit (MTU) for the data packets;
a data packet protocol for the data packets; or
error correction applied to one or more of the data packets.

19. The method of claim 11, further comprising:
inserting, into each data segment of the multiple data segments, the format or type of the file and a data segment offset indicating a sequence order in which a respective data segment was created.

20. A first device comprising:
a processing system; and
memory coupled to the processing system, the memory comprising computer executable instructions that, when executed, perform operations comprising:
separating a file into multiple data chunks, wherein separating the file into the multiple data chunks comprises inserting, into each data chunk of the multiple data chunks, a file identifier for the file, a data chunk identifier for the data chunk, and a data chunk offset indicating a sequence order in which a respective data chunk was created;
separating each data chunk of the multiple data chunks into multiple data segments, wherein separating the file into the multiple data segments comprises inserting, into each data segment of the multiple data segments, the file identifier for the file, a data segment identifier for the data segment, and a data segment offset indicating a sequence order in which a respective data segment was created;
applying error correction coding to a data chunk of the multiple data chunks or a data segment of the multiple data segments; and
providing the multiple data chunks and the multiple data segments to a second device, wherein the first device and the second device are implemented in a one-way transfer (OWT) system.

* * * * *